US010240663B2

(12) United States Patent
Nickel

(10) Patent No.: US 10,240,663 B2
(45) Date of Patent: Mar. 26, 2019

(54) DRIVE MECHANISM HAVING A DOUBLE WORM GEAR

(71) Applicant: WITTE Automotive GmbH, Velbert (DE)

(72) Inventor: Andreas Nickel, Sprockhövel (DE)

(73) Assignee: WITTE AUTOMOTIVE GMBH, Velbert (DE)

( * ) Notice: Subject to any disclaimer, the term of this patent is extended or adjusted under 35 U.S.C. 154(b) by 422 days.

(21) Appl. No.: 15/069,243

(22) Filed: Mar. 14, 2016

(65) Prior Publication Data
US 2016/0273617 A1 Sep. 22, 2016

(30) Foreign Application Priority Data

Mar. 19, 2015 (DE) .................. 10 2015 104 111

(51) Int. Cl.
| F16D 3/06 | (2006.01) |
| F16H 1/20 | (2006.01) |
| F16H 25/20 | (2006.01) |
| E05F 15/603 | (2015.01) |
| E05F 15/611 | (2015.01) |
| B60N 2/90 | (2018.01) |
| B60N 2/02 | (2006.01) |

(52) U.S. Cl.
CPC .............. *F16H 1/203* (2013.01); *B60N 2/919* (2018.02); *E05F 15/603* (2015.01); *E05F 15/611* (2015.01); *F16H 25/20* (2013.01); *B60N 2002/0236* (2013.01); *E05Y 2201/618* (2013.01); *E05Y 2201/696* (2013.01); *E05Y 2900/50* (2013.01); *F16H 2025/209* (2013.01); *F16H 2025/2081* (2013.01)

(58) Field of Classification Search
CPC .............. F16H 1/203; F16H 2025/2081; F05F 15/603; B60N 2/919
See application file for complete search history.

(56) References Cited

U.S. PATENT DOCUMENTS

| 4,444,071 A * | 4/1984 | Guichard .................. B60S 1/16 29/434 |
| 5,570,606 A * | 11/1996 | Irie ......................... F16H 1/203 74/425 |
| 6,513,398 B1 * | 2/2003 | Finkemeyer .......... A47C 20/041 192/141 |
| 8,051,965 B2 * | 11/2011 | Kim ........................ F16D 28/00 192/20 |
| 2001/0029800 A1 * | 10/2001 | Bucholz .................... F16H 1/16 74/425 |

(Continued)

FOREIGN PATENT DOCUMENTS

| DE | 102010038596 A1 | 2/2012 |
| DE | 102011084531 A1 | 4/2013 |

OTHER PUBLICATIONS

Extended German search report for related German application No. 102015104111.1, dated Jul. 28, 2015, pp. 7.

*Primary Examiner* — David M Fenstermacher
(74) *Attorney, Agent, or Firm* — Cantor Colburn LLP

(57) ABSTRACT

The invention relates to a drive mechanism having a drive motor and a drive element drivable by the drive motor. A first worm gear, which has a first worm gear shaft and a first worm wheel, and a second worm gear, which has a second worm gear shaft and a second worm wheel, are connected between the drive motor and the drive element.

13 Claims, 4 Drawing Sheets

(56) References Cited

U.S. PATENT DOCUMENTS

Figure 1:
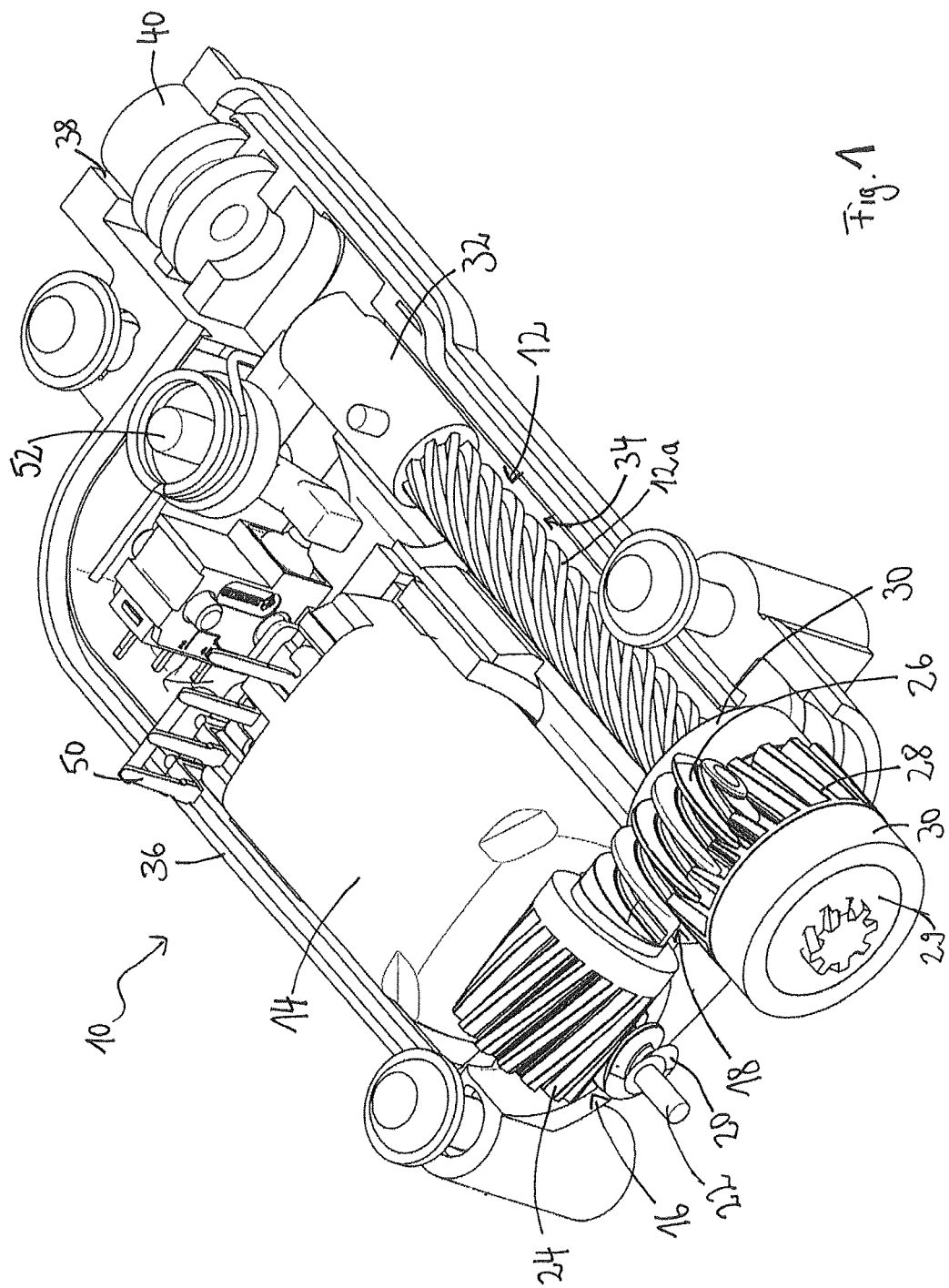

| | | | |
|---|---|---|---|
| 2002/0023514 A1* | 2/2002 | Matsukawa | F16H 1/16 74/425 |
| 2005/0115350 A1* | 6/2005 | Ohashi | B60N 2/0232 74/425 |
| 2006/0117890 A1* | 6/2006 | Li | F16H 37/06 74/425 |
| 2016/0273617 A1* | 9/2016 | Nickel | F16H 1/203 |

\* cited by examiner

DRIVE MECHANISM HAVING A DOUBLE WORM GEAR

The present invention relates to a drive mechanism having a drive motor and a drive element drivable by the drive motor. The invention further relates to an apparatus for opening or closing a door or flap, to an apparatus for actuating a motor vehicle lock, to a camera arrangement and to a seat adjustment device.

A drive mechanism of the initially named kind is used, for example, in a vehicle to actuate different apparatus which increase the comfort of a vehicle operator, such as the locking mechanism of a door or of a cover, an extension mechanism of a rear view camera or a seat adjustment device.

Due to the increasing number of such apparatus in the vehicle, it is becoming more and more difficult to accommodate the associated drive mechanisms in the existing construction space of the vehicle.

It is the underlying object of the invention to provide a drive mechanism which requires a small construction space and thus allows or facilitates an accommodation in the existing construction space of a vehicle.

The object is satisfied by a drive mechanism having the features of claim 1 and in particular in that a first worm gear, which has a first worm gear shaft and a first worm wheel, and a second worm gear, which has a second worm gear shaft and a second worm wheel, are connected in series between the drive motor and the drive element.

It is the underlying idea of the invention to effect a gear reduction, which is required as a rule, between the drive motor and the drive element with the aid, instead of spur gears, of two worm gears connected in series, that is so to-day with the aid of a double worm gear. A decisive advantage results in comparison with the use of known spur gear units by the possibility of building worm gears with high gear ratios and low gear ratios respectively in a compact construction. This effect becomes even more decisive with the arrangement of two worm gears in series. A drive mechanism is thus provided which requires a comparatively small construction space with a relatively large gear reduction—for example 60:1. In addition, the worm gears provide a low-noise operation of the drive mechanism.

Advantageous embodiments can be found in the dependent claims, in the description and in the drawings.

In accordance with an embodiment, the first worm wheel and the second worm gear shaft are rotationally fixedly coupled to one another. For example, the first worm wheel and the second worm gear shaft can each be rotationally fixedly attached to a common shaft. The rotationally fixed coupling between the shaft and the first worm wheel, on the one hand, and between the shaft and the second worm gear shaft, on the other hand, can be produced by shape matching or by force transmission. A direct and low-friction torque transmission between the first worm wheel and the second worm gear shaft is effected by the rotationally fixed coupling.

In accordance with a specific embodiment, the first worm wheel and the second worm gear shaft are configured in one piece with one another.

A drive shaft of the drive motor can furthermore be rotationally fixedly coupled to the first worm gear shaft. This coupling can also be produced by shape matching or force transmission. A direct and low-friction torque transmission between the drive shaft and the first worm gear shaft is hereby effected.

To simplify the assembly, the first worm gear shaft can be configured in one piece with the drive shaft.

The drive motor is advantageously configured as an electric motor. The electric motor can in this respect be configured as a brush motor. The electric motor can, however, also be configured as a brushless motor to save weight.

In accordance with an embodiment, the drive element comprises a spindle. A rotational movement can be converted in a simple manner into a translatory movement with the aid of a spindle and with the aid of an associated spindle nut which together represent a spindle drive. In this respect, a travel path of the drive element can be individually set by the choice of the length of the spindle.

The drive shaft of the drive motor can in this respect be arranged at least substantially in parallel with the spindle. This results in an even more compact construction shape.

The second worm wheel can be rotationally fixedly coupled to the spindle nut which is in threaded engagement with the spindle. A direct torque transfer from the second worm wheel to the spindle nut is hereby effected.

The second worm wheel can in particular be configured in one piece with the spindle nut to simplify the assembly of the drive mechanism.

The drive element can comprise, alternatively or additionally to a spindle, a crank, a pivot arm or a toothed wheel. A drive mechanism having a crank is in this respect particularly well suited for a coupling of the second worm wheel to a pivot mechanism for a camera.

In this respect, the second worm wheel can be rotationally fixedly connected to the crank, to the pivot arm or to the toothed wheel and can in particular be configured in one piece therewith.

In accordance with a further embodiment, the drive mechanism can comprise a sensor unit which is configured to detect a position and/or a travel path of the drive mechanism. For this purpose, the position and/or the travel path can be detected as an angular value in that a magnetic ring is fastened to the drive shaft of the drive motor and in that a Hall sensor detects an angular position and/or an angular movement of the magnetic ring. Alternatively or additionally, the drive mechanism can comprise a microswitch which detects an end abutment of the drive element.

The drive mechanism can furthermore comprise a speed regulation unit for regulating the drive speed. A speed control unit can also be provided instead of the speed regulation unit to save costs.

In accordance with an embodiment, the drive mechanism is used for actuating, in particular for unlocking or locking, a vehicle lock. For example, a pawl can be opened with the help of the drive mechanism so that a catch can pivot outward. Door locks, locks for engine hoods or trunk covers, back rest locks, seat bottom latches and convertible roof locks can be considered as vehicle locks, for example.

In accordance with a further embodiment, the drive mechanism is used for actuating an apparatus which is configured to open and/or to close a door or flap of a motor vehicle at least partly. In this respect, a lock of a trunk cover can, for example, first be unlocked with the aid of the drive mechanism and then the trunk cover can be opened by the drive mechanism or by a second drive mechanism which is in particular a drive mechanism of the same type. The drive mechanism can, for example, be assisted by a gas pressure spring on the opening of the trunk cover. When closing, the drive mechanism can at least partly draw the door or flap closed. The drive mechanism can in particular be used as a drive for a so-called closing aid with which doors and flaps can be brought into their closed state in a motorized manner.

A pivot mechanism for a camera arrangement can furthermore be driven by a previously described drive mechanism. For this purpose, a vehicle can be equipped with a camera unit and a pivot mechanism for pivoting the camera unit into an active position and into a position of rest. The camera unit can be accommodated in an inaccessible manner from the outside in a position of rest in a chamber and is pivoted out of the chamber in an active position for the optical detection of a surrounding zone.

Figure 2:
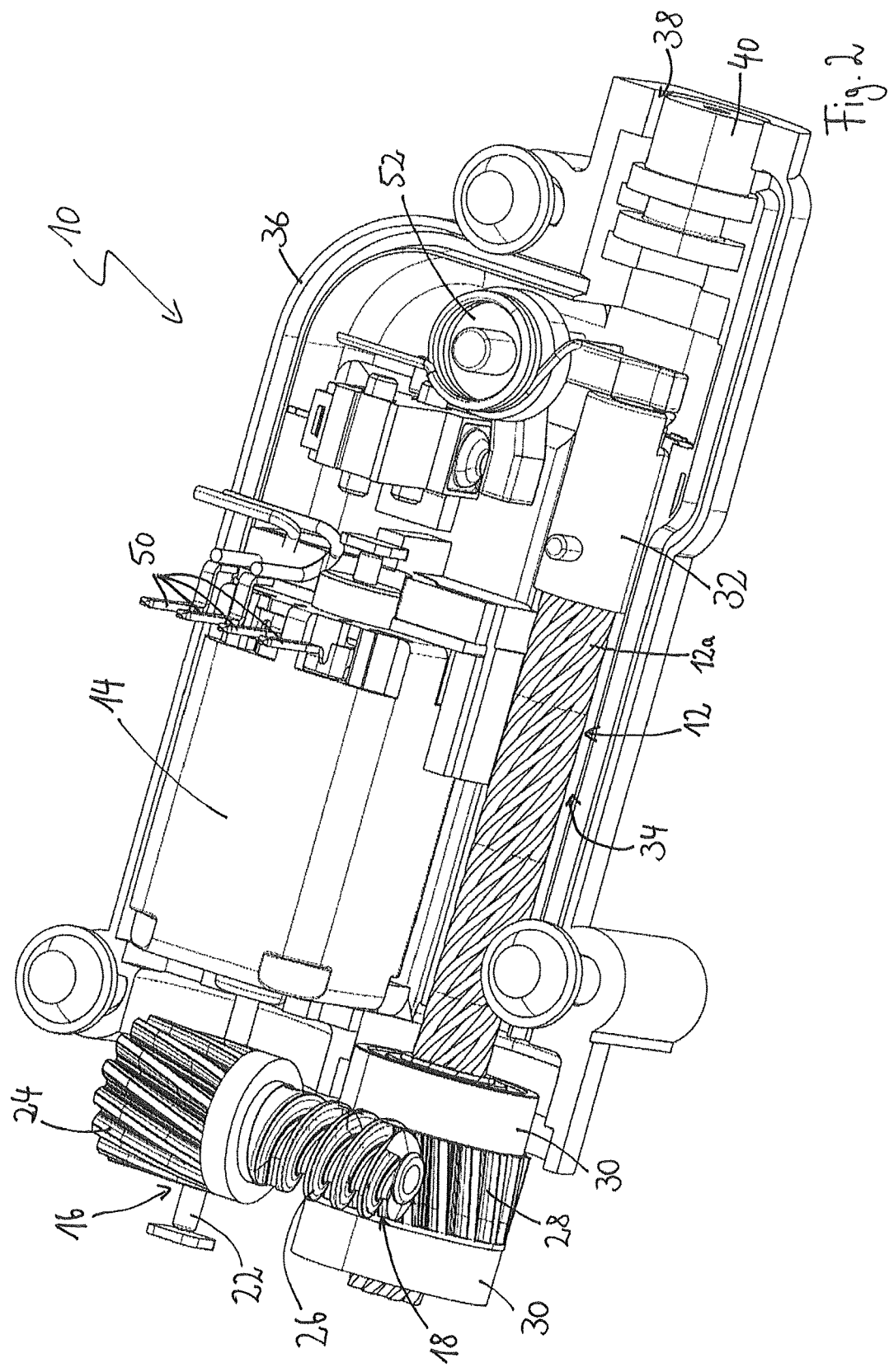
Figure 3:
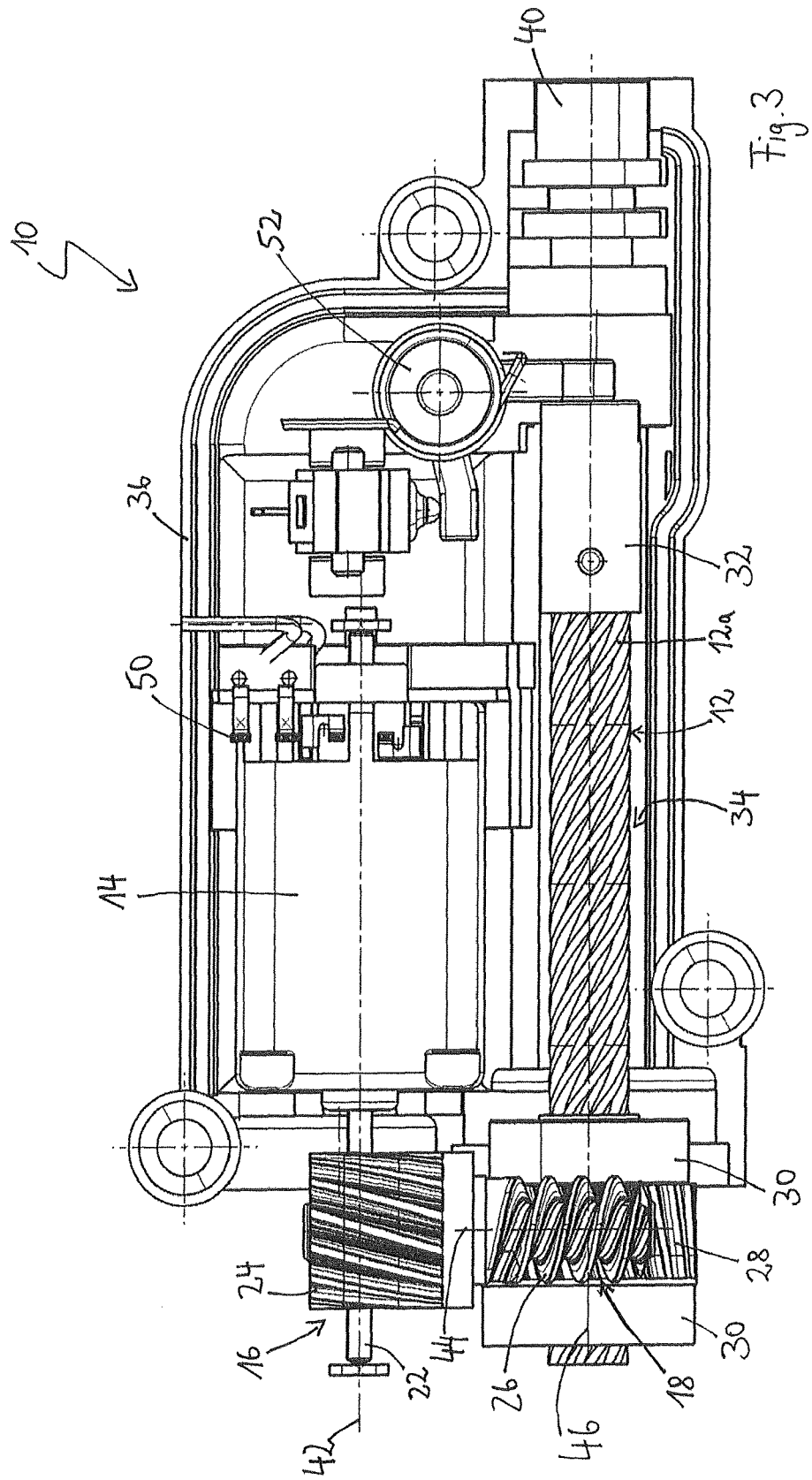

The invention will be described in the following with reference to a purely exemplary embodiment and to the enclosed drawings. There are shown:

FIG. 1 a perspective representation of a drive mechanism in accordance with the invention;

FIG. 2 a further perspective representation of the drive mechanism of FIG. 1;

FIG. 3 a plan view of the drive mechanism of FIG. 1; and

Figure 4:
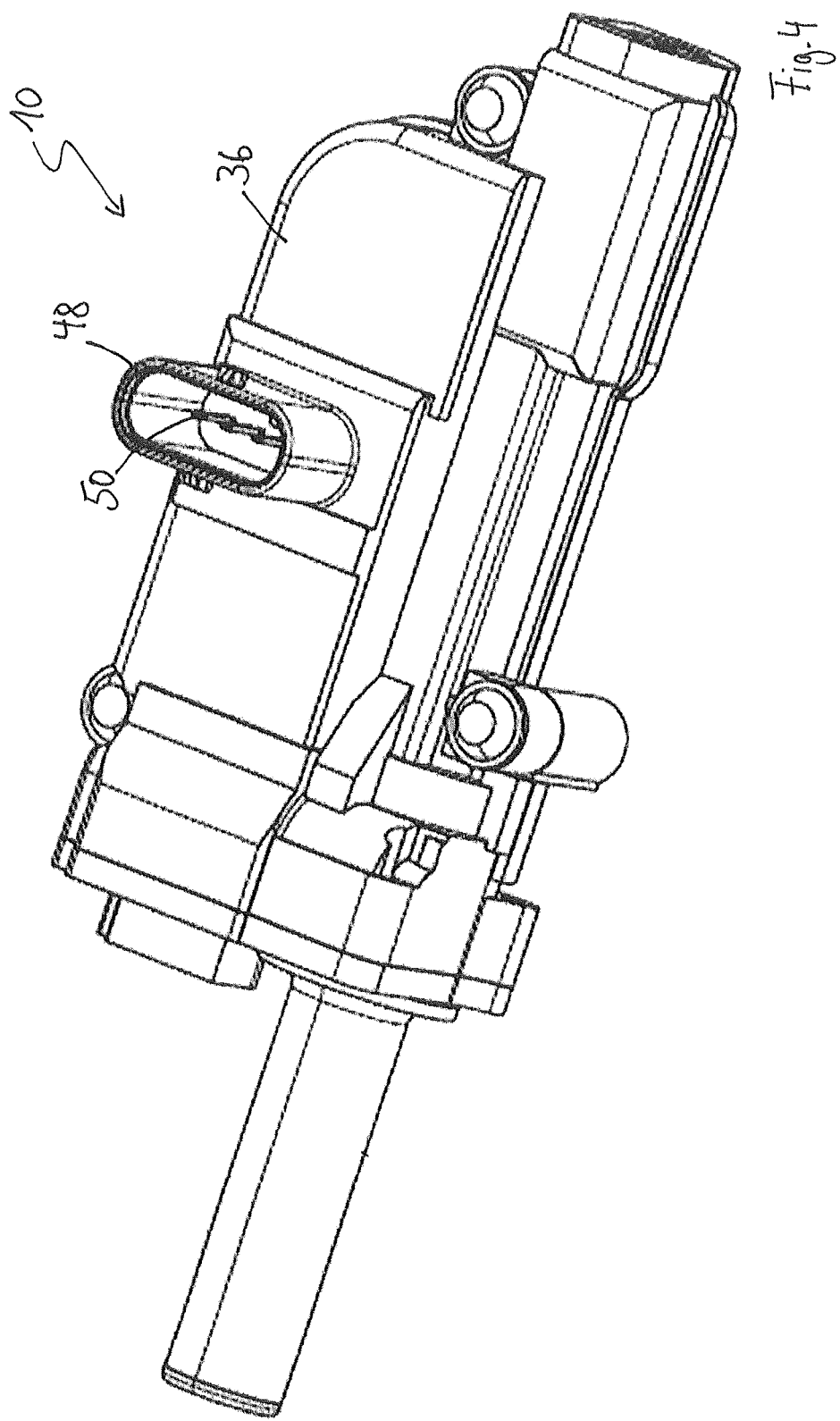

FIG. 4 a perspective representation of the drive motor of FIG. 1 with a housing.

FIG. 1 shows a drive mechanism 10 which is, for example, suitable for locking and unlocking a motor vehicle lock.

The drive mechanism 10 comprises a drive element 12 configured as a spindle 12a and a drive motor 14 configured as an electric motor. A first worm gear 16 and a second worm gear 18 are connected between the drive motor 14 and the drive element 12 to increase or decrease a rotational drive speed and a drive torque of the drive motor 14.

The first worm gear 16 comprises a first worm gear shaft 20 which is rotationally fixedly coupled to a drive shaft 22 of the drive motor 14 and a first gear wheel 24 which is in meshing engagement with the first worm gear shaft 20. The first worm wheel 24 is rotationally fixedly coupled to a second worm gear shaft 26 and is arranged coaxial with the second worm gear shaft 26. The second worm gear shaft 26 is in meshing engagement with a second worm wheel 28. Together, they form the second worm gear 18.

The second worm wheel 28 is rotationally fixedly coupled to a spindle nut 29 in which the spindle 12a is guided. A rotational movement of the spindle nut 29 in this respect provides a translatory movement of the spindle 12a. The spindle nut 29 is rotatably supported with the aid of two bearings 30. The bearings 30 can be configured as slide bearings or as ball bearings, for example. The bearings 30 are each arranged at oppositely disposed end faces of the second worm wheel 28. It would also be conceivable to provide only one bearing 30 or more than two bearings 30 instead of two bearings 30.

A carriage 32, which is formed at the spindle or which is coupled to the spindle 12a, is provided at an end region of the spindle 12a. The carriage 32 is guided in a guide 34 and is configured to be coupled to a power transmission element, not shown. It is possible to pull at the power transmission element and/or to press the power transmission element away by a movement of the carriage 32 in order, for example, to unlock a lock. A cable, a wire, a piston of a hydraulic system or of a pneumatic system or a rod are, for example, suitable as a power transmission element.

The drive mechanism 10 furthermore comprises a housing 36 in which the drive mechanism 10 is accommodated. A shaft, not shown, on which the first worm wheel 24 and the second worm gear shaft 26 are arranged is rotatably supported at the housing 36. The spindle nut 29 is furthermore rotatably supported in the housing 36 with the aid of the bearings 30. The housing 36 has, as can be seen in FIG. 2, an opening 38 in which a guide element 40 is arranged for the power transmission element, not shown.

As can specifically be seen in FIG. 3, a longitudinal axis 42 of the drive shaft 22 is perpendicular to a longitudinal axis 44 of the shaft, not shown, on which the first worm wheel 34 and the second worm gear shaft 26 are arranged. The longitudinal axis 44 in this respect forms an axis of rotation about which the first worm wheel 24 and the second worm gear shaft 26 can rotate. The longitudinal axis 44 is in turn perpendicular to a longitudinal axis 46 of the spindle 12a. The longitudinal axis 42 of the drive shaft 22 is thus aligned in parallel with the longitudinal axis 46 of the spindle 12a.

As can be seen from FIG. 4, the drive mechanism 10 comprises a connector socket 48 having plug contacts 50 into which a plug, not shown, can be plugged for the power supply of the drive motor 14. The drive mechanism 10 furthermore comprises a microswitch 52 which detects an abutment of the carriage 32 at the microswitch 52 and thereupon, for example, sends a signal to the drive motor 14 to switch off the drive motor 14.

The drive motor 14 is supplied with electrical energy to move the spindle 12a along its longitudinal axis 46. The drive motor converts the electrical energy into a rotational movement of the drive shaft 22 and of the first worm gear shaft 20. The rotational movement of the first worm gear shaft 20 is transmitted at a predefined transmission ratio to the first worm wheel 24 and to the second worm gear shaft 26. The rotational movement of the first worm wheel 24 and of the second worm gear shaft 26 is in turn transmitted at a predefined transmission ratio to the second worm wheel 28 and to the spindle nut 29. The spindle 12a is moved along its longitudinal axis 46 by the rotational movement of the spindle nut 29 resulting therefrom. To move the spindle 12a in the opposite direction along the longitudinal axis 46, the drive motor 14 is operated in the reverse direction of rotation.

The first worm gear 16 and the second worm gear 18 are in this respect configured such that, connected in series, they generate a reduction in the rotational speed of the drive motor 14, i.e. the spindle nut 29 always rotates more slowly than the drive shaft 22. In this respect, the reduction ratio of the worm gears 16, 18 connected in series can, for example, be in the range between 30:1 and 90:1.

Whereas the embodiment of the drive mechanism 10 shown in the Figures has a spindle drive as the drive element 12, a number of other drive elements 12 such as a crank, a pivot arm, a toothed wheel, a belt or similar are also conceivable in dependence on the desired movement of the drive element 12.

The drive mechanism 10 described here can be used for opening or closing a door or a cover, for operating a pivot mechanism for rear view cameras, for an electrical adjustment of a seat, for the locking and unlocking of a lock or for similar applications in the vehicle.

REFERENCE NUMERAL LIST 10 drive mechanism
12 drive element
12a spindle
14 drive motor
16 first worm gear
18 second worm gear
20 first worm gear shaft
22 drive shaft
24 first worm wheel
26 second worm gear shaft
28 second worm wheel 29 spindle nut
32 carriage
34 guide
36 housing
38 opening
40 guide element
42 longitudinal axis
44 longitudinal axis
46 longitudinal axis
48 connector socket
50 plug contacts
52 microswitch

The invention claimed is:

1. A drive mechanism having a drive motor and a drive element which can be driven by the drive motor, in which the drive element comprises a spindle, in which a first worm gear, which has a first worm gear shaft and a first worm wheel, and a second worm gear, which has a second worm gear shaft and a second worm wheel, are connected in series between the drive motor and the drive element.

2. The drive mechanism in accordance with claim 1, in which the first worm wheel and the second worm gear shaft are rotationally fixedly coupled to one another.

3. The drive mechanism in accordance with claim 1, in which a drive shaft of the drive motor is rotationally fixedly coupled to the first worm gear shaft.

4. The drive mechanism in accordance with claim 1, in which a drive shaft of the drive motor is arranged at least substantially in parallel with the spindle.

5. The drive mechanism in accordance with claim 1, in which the second gear wheel is rotationally fixedly coupled to a spindle nut which is in threaded engagement with the spindle.

6. The drive mechanism in accordance with claim 5, in which the second worm wheel is configured in one piece with the spindle nut.

7. The drive mechanism in accordance with claim 1, in which the drive element comprises a crank, a pivot arm or a toothed wheel.

8. The drive mechanism in accordance with claim 7, in which the second worm wheel is rotationally fixedly connected to the crank, to the pivot arm or to the toothed wheel.

9. The drive mechanism in accordance with claim 8, in which the second worm wheel is rotationally fixedly connected to the crank, to the pivot arm or to the toothed wheel and is configured in one piece therewith.

10. An apparatus for the at least part opening or closing of a door or flap of a vehicle having a drive mechanism comprising a drive motor and a drive element which can be driven by the drive motor, in which the drive element comprises a spindle, in which a first worm gear, which has a first worm gear shaft and a first worm wheel, and a second worm gear, which has a second worm gear shaft and a second worm wheel, are connected in series between the drive motor and the drive element.

11. An apparatus for actuating a vehicle lock having a drive mechanism comprising a drive motor and a drive element which can be driven by the drive motor, in which the drive element comprises a spindle, in which a first worm gear, which has a first worm gear shaft and a first worm wheel, and a second worm gear, which has a second worm gear shaft and a second worm wheel, are connected in series between the drive motor and the drive element.

12. A camera arrangement for a vehicle having a camera unit and a pivot mechanism for the pivoting of the camera unit into an active position and into a position of rest, wherein the camera unit is accommodated in an inaccessible manner from the outside in the position of rest in a chamber and is pivoted out of the chamber in an active position for the optical detection of a surrounding zone,
   wherein the pivot mechanism can be driven by a drive mechanism comprising a drive motor and a drive element which can be driven by the drive motor, in which the drive element comprises a spindle, in which a first worm gear, which has a first worm gear shaft and a first worm wheel, and a second worm gear, which has a second worm gear shaft and a second worm wheel, are connected in series between the drive motor and the drive element.

13. A seat adjustment device for a motor vehicle having a drive mechanism comprising a drive motor and a drive element which can be driven by the drive motor, in which the drive element comprises a spindle, in which a first worm gear, which has a first worm gear shaft and a first worm wheel, and a second worm gear, which has a second worm gear shaft and a second worm wheel, are connected in series between the drive motor and the drive element.

\* \* \* \* \*